United States Patent [19]

Rous

[11] E Re. 29,658

[45] Reissued June 6, 1978

[54] BOOK CARTON WITH IMPROVED OPENER

[75] Inventor: Benjamin Rous, New York, N.Y.

[73] Assignee: Stone Container Corporation, Chicago, Ill.

[21] Appl. No.: 766,434

[22] Filed: Feb. 7, 1977

Related U.S. Patent Documents

Reissue of:

[64] Patent No.: 3,989,141
Issued: Nov. 2, 1976
Appl. No.: 662,962
Filed: Mar. 1, 1976

[51] Int. Cl.[2] ..... B65D 85/54

[52] U.S. Cl. ..... 206/424; 206/605; 206/626; 206/628; 229/40

[58] Field of Search ..... 229/40, 34 HW, 51 TS, 229/51 AS; 206/424, 521

[56] References Cited

U.S. PATENT DOCUMENTS

| | | | |
|---|---|---|---|
| 3,386,641 | 6/1968 | Cassidy | 229/40 X |
| 3,386,642 | 6/1968 | Young | 206/424 X |
| 3,682,370 | 8/1972 | Rous | 206/424 |
| 3,712,531 | 1/1973 | McCall | 229/40 |
| 3,722,783 | 3/1973 | Rous | 229/40 |

*Primary Examiner*—Stephen P. Garbe
*Attorney, Agent, or Firm*—Darby & Darby

[57] ABSTRACT

Cartons for packaging and mailing books and the like include parallel top and bottom walls which are foldably interconnected by a pair of parallel side walls to form a tubular structure and a closure and protecting structure for each end of the tubular structure including end flaps having an inner and outer portion. A pair of hingedly connected tabs formed in the bottom wall of the carton are normally positioned perpendicular to the bottom wall. A notch is formed at one end of each of the end flap outer portions. A closure flap attached to a side wall of the carton is normally coplanar with the end flap outer portions and parallel to the bottom wall. A tear strip formed in the top wall is normally located above the closure flap.

10 Claims, 6 Drawing Figures

BOOK CARTON WITH IMPROVED OPENER

Matter enclosed in heavy brackets [ ] appears in the original patent but forms no part of this reissue specification; matter printed in italics indicates the additions made by reissue.

BACKGROUND OF THE DISCLOSURE

This invention generally relates to cartons for packaging books and the like, having triangularly shaped closure ends which provide protection for the enclosed book.

The present invention is an improvement over the carton disclosed in U.S. Pat. No. 3,722,783, the disclosure of which is hereby incorporated herein. While the carton disclosed is U.S. Pat. No. 3,722,783 has proved satisfactory, the improved carton of this invention can be erected on inexpensive machines which provide for parallel side gluing only. With the carton of this invention, gluing of the front part of the carton, as in the carton disclosed in U.S. Pat. No. 3,722,783, can be avoided and less expensive machinery can be used in erecting and packing the carton.

As with the carton disclosed in U.S. Pat. No. 3,722,783, the carton of this invention can be easily opened without damaging the carton and is easily reclosable after the carton has been opened and the contents have been removed and examined. These features are important to those who send goods such as books, records and the like to end users who may return the goods if they so desire. Thus, it is not only important to provide a carton which protects the goods when they are sent to the end user, but is is also important to provide a carton in which the goods can be easily repackaged by the end user and also to provide a repackaged carton which will protect the goods during transit.

SUMMARY OF THE INVENTION

The carton of this invention is substantially similar to the carton disclosed in U.S. Pat. No. 3,722,783. However, instead of having a tear strip formed in a closure flap which is foldably connected to the top wall and which overlays the outer surface of the bottom wall, the carton of this invention provides a tear strip formed in the top wall of the carton and a closure flap foldably connected to the bottom wall and further provides a notch formed at one end of each of the inner end flap outer portions so that the closure flap, which is normally positioned parallel to the bottom wall, is coplanar with the inner end flap outer portions which are also parallel to the bottom wall. The top wall in which the tear strip if formed is normally positioned to overlay the closure flap.

Tabs are foldably connected to each end of the closure flap and are normally positioned obliquely with respect to the bottom wall. The closure flap end tabs serve to lock the closure flap in place and to prevent the side wall to which the closure flap is foldably connected from caving inwardly thereby permitting possible damage to the contents of the carton.

A notch may also be formed in the closure flap so that there is no overlap of the inner end flap outer portion by the closure flap in the erected carton. In this way, the closure flap can be made as long as desired in order to prevent pilfering of the carton through the unglued end without overlying the inner end flap outer portion.

In addition to the tear strip formed transverse of the top wall, perforated score lines are formed at the ends of the tear strip along the fold line connecting the top wall to the outer end flaps and extending to the side edge of the top wall.

When it is desired to open the carton, the tear strip is grasped and pulled across the top wall. This effectively separates the top wall into two segments. The smaller segment which is adjacent one side of the carton is grasped by the user and pulled upwardly thereby tearing the perforated score lines formed in the top wall. The tearing back of the top wall portion exposes the contents of the carton. In order to repackage the carton, it is merely necessary to fold the opened portion back into position and place a piece of tape across the intersection between the closure flap and the top wall. The carton is then ready for re-mailing.

The structural features of the invention and the complete nature thereof will become more apparent following a consideration of the ensuing specification and the appended claims in which the invention is defined, particularly when taken in conjunction with the accompanying illustrative drawings setting forth a preferred embodiment of the invention.

DESCRIPTION OF A PREFERRED EMBODIMENT

Figure 1:
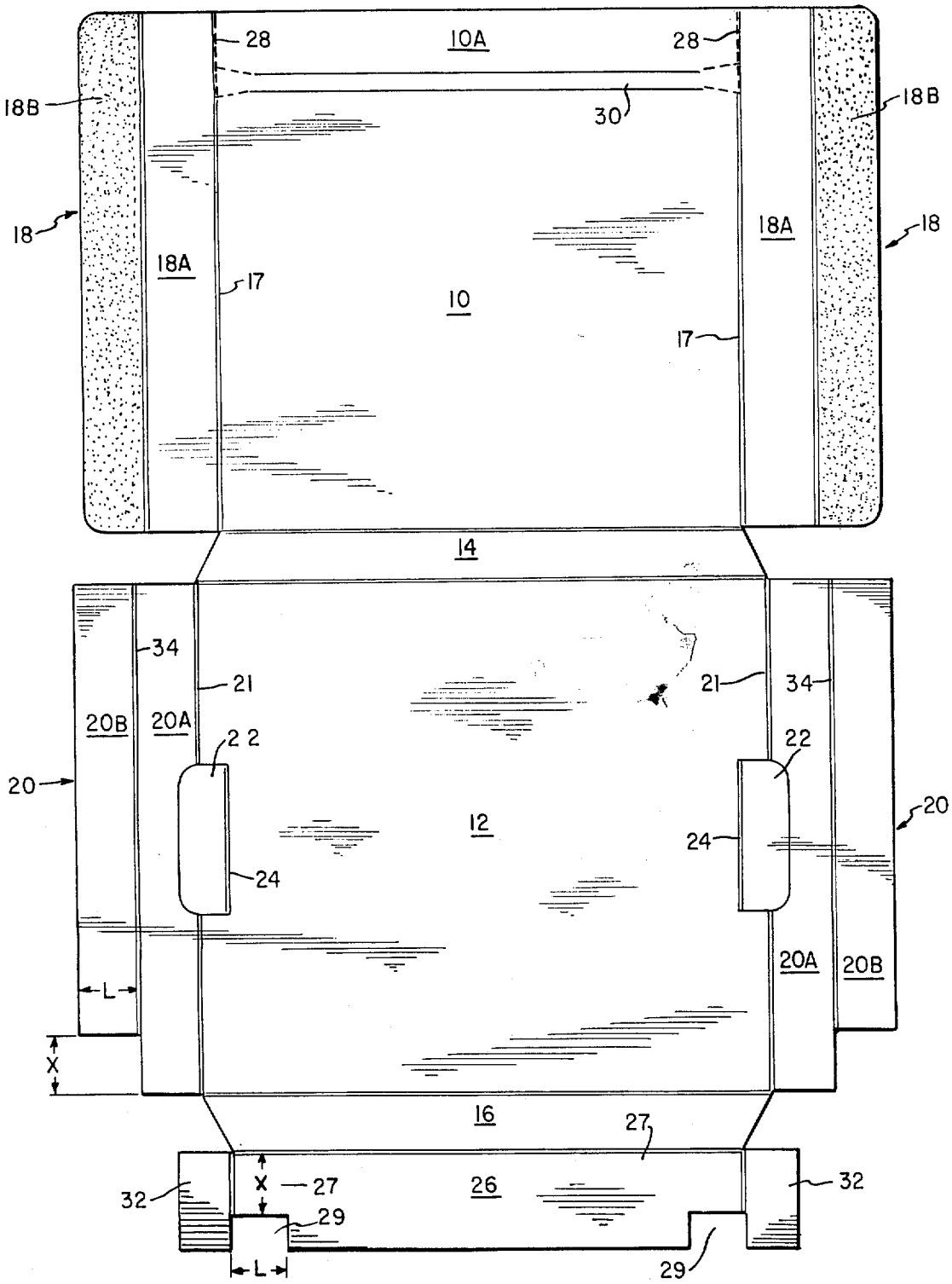
FIG. 1 is a top plan view of an unerected carton illustrating a preferred embodiment of my invention.

Referring to FIG. 1, the carton blank of this invention comprises a rectangularly shaped top wall 10 and a rectangularly shaped bottom wall 12 which are foldably interconnected by a trapezoidally shaped side wall 14 and which are normally positioned parallel to one another. A trapezoidally shaped side wall 16 is foldably connected to bottom wall 12 and is normally positioned parallel to side wall 14 and perpendicular to top and bottom walls 10 and 12 respectively.

Outer end flaps 18 are foldably connected to each end of top wall 10 along a score line or folding line 17 and comprise an inner portion 18A normally positioned obliquely with respect to top wall 10 and an outer portion 18B which is normally positioned parallel to the bottom wall 12. The speckling on the end flap outer portions 18B in the drawings indicates that glue is applied to these surfaces and that they are glued to the outer surface of bottom wall 12.

Inner end flaps 20 are foldably connected to each end of the bottom wall 12 along a score line 21. Similar to the outer end flaps 18, the inner end flaps 20 are divided by a score line 34 into an inner portion 20A which is normally positioned obliquely with respect to the bottom wall 12 and an outer portion 20B which is normally positioned parallel to the bottom wall 12.

Tabs 22 are formed partly in the bottom wall 12 and partly in the inner portion 20A of each of the inner end flaps. The tabs 22 are normally positioned perpendicular to the bottom wall and are generally of a height which corresponds to the contents of the carton. The tabs 22 are completely cut out about three sides and are foldably connected to the bottom wall 12 of the carton along a score line 24.

Figure 2:
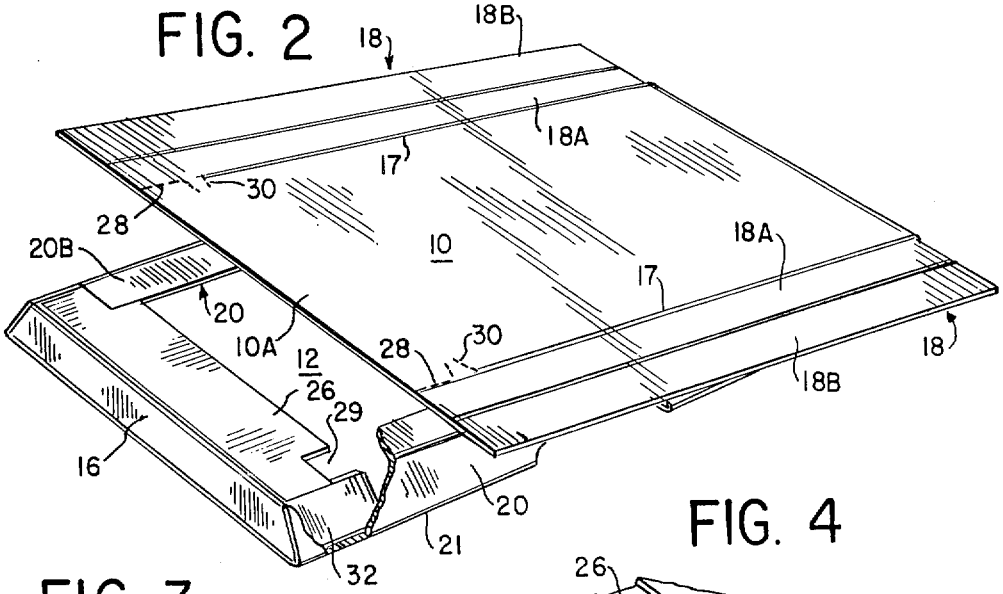
FIG. 2 is a perspective view of a partially erected carton.

A closure flap 26 is foldably connected to side wall 16 and is normally positioned parallel to the bottom wall 12 below the inner surface of the top wall 10, as best illustrated in FIG. 2. FIG. 2 further illustrates that there is no glue applied to the outer surface of the closure flap 26 so that the closure flap merely lies beneath a portion of the inner surface of top wall 10 in the erected carton.

The portion of the inner surface of top wall 10 which overlies the outer surface of closure flap 26 is generally defined by the area on top wall 10 bounded by the perforated score lines 28 which extend along a portion of score line 17, and by the tear strip 30, which extends transversely of the top wall 10. For ease or reference, this portion of the top wall is designated top wall portion 10A, as illustrated in FIG. 2.

Referring again to FIG. 1, the length of the inner end flap outer portions 20B is formed so that it is shorter by a predetermined amount, designated X in FIG. 1, than the length of the inner end flap inner portions 20A. It thus appears that a notch, approximately the width of the inner end flap outer portion 20B and a length designated X, is formed in the inner end flap outer portion 20B.

It should be noted that the widths of the end portions 27 of the closure flap 26 are substantially the same as the length of the notch formed in the inner end flap outer portion 20B and are marked by the same length designation X in FIG. 1. Also the length L of the closure flap end portions 27 is substantially the same as the width L of the inner end flap outer portions 20B. Since the width of the main portion of the closure flap 26 exceeds the width of the closure flap end portions 27, notches 29 are thereby formed in the closure flap 26. As previously mentioned, the width of the main portion of the closure flap 26 can be extended in order to prevent pilfering of the carton through the unglued carton end.

Referring to FIG. 2, it is seen that the notches 29 formed in the closure flap 26 fit into the notches formed in each of the inner end flap outer portions 20B so that the closure flap 26 is normally positioned in the same plane as the inner end flap outer portions 20B.

Referring to FIGS. 1 and 2, a tab 32 is foldably connected to each end of the closure flap 26. The closure flap end tabs 32 are normally positioned obliquely with respect to the closure flap 26. These closure flap end tabs contact the bottom wall of the carton and serve to support the closure flap so that it remains in the same plane as the inner end flap outer portions 20B, as best illustrated in FIG. 2.

Figure 3:
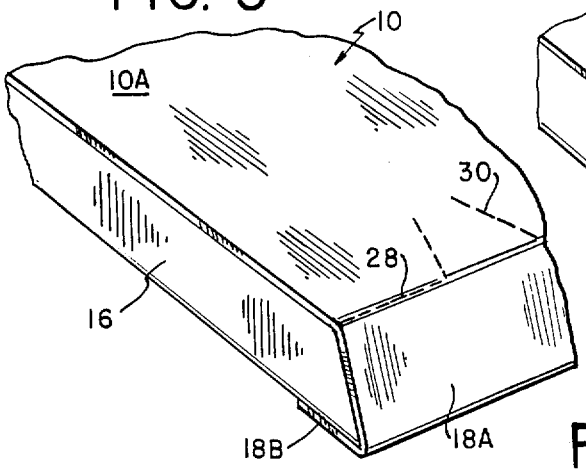
FIG. 3 is a perspective view of a portion of the erected carton.
Figure 6:
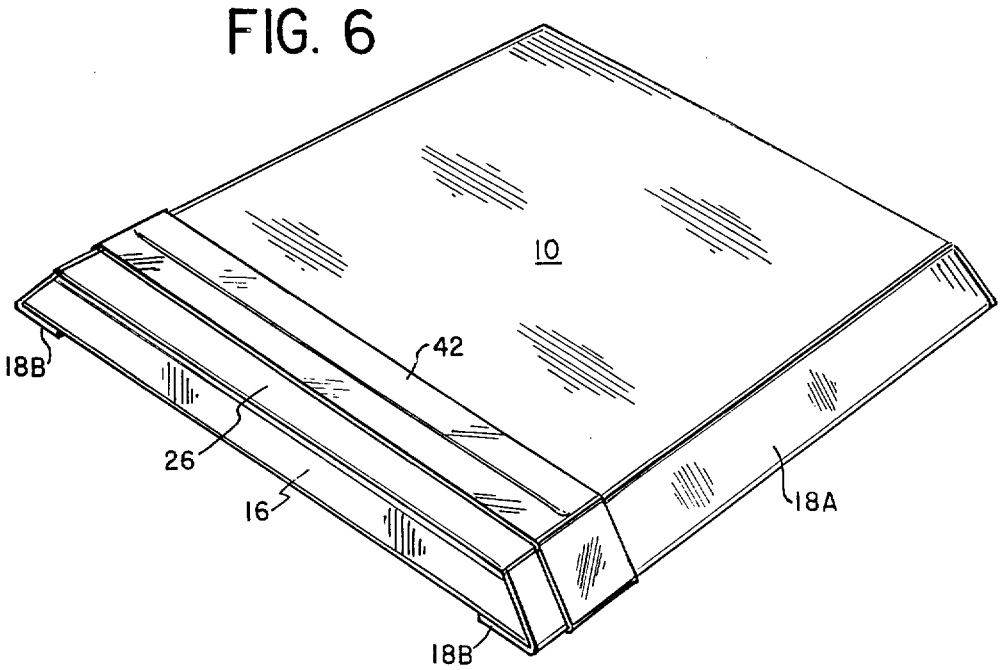
FIG. 6 is a perspective view of an erected carton which has been resealed.

Referring to FIG. 3, a portion of the erected carton is illustated. As illustrated in U.S. Pat. No. 3,722,783, the bottom wall tabs 22 are normally positioned perpendicular to the bottom wall 12 in the erected carton and the inner end flap inner portions 20A are normally positioned obliquely with respect to bottom wall 12 so that the score line 34 between the inner end flap inner and outer portions 20A and 20B is intersected by the bottom wall tab 22. The inner end flap outer portions 20B extend parallel to bottom wall 12 as illustrated in FIG. 2 and as also seen in FIG. 6 of U.S. Pat. No. 3,722,783. The outer end flap inner portions 18A are folded over the inner end flap inner portions 20A, as illustrated in FIG. 3, and the outer end flap outer portions 18B are glued to the outer surface of the bottom wall 12.

As previously discussed, the top wall portion 10A is not glued to the outer surface of the closure flap 26 in forming the erected carton portion illustrated in FIG. 3.

Figure 4:
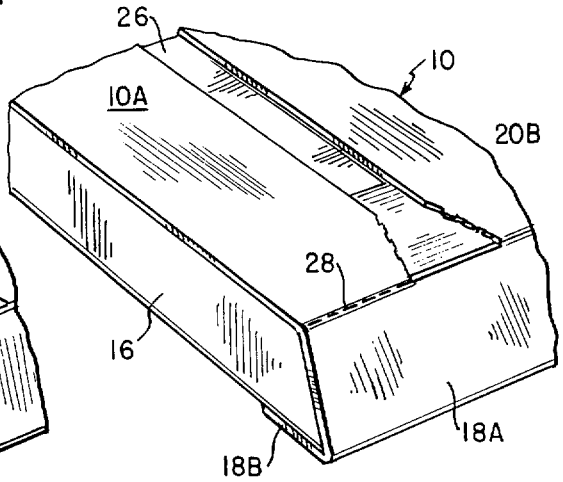
FIG. 4 is a perspective view of a portion of the erected carton with the tear strip removed.

Referring now to FIG. 4, when it is desired to open the carton illustrated in FIG. 3, the tear strip 30 is grasped by the user and pulled across the width of the carton. This results in the top wall portion 10A being separated from the remainder of the top wall, as illustrated in FIG. 4. Once the tear strip is torn away, the portion of the closure flap 26 beneath the tear strip is made visible.

Figure 5:
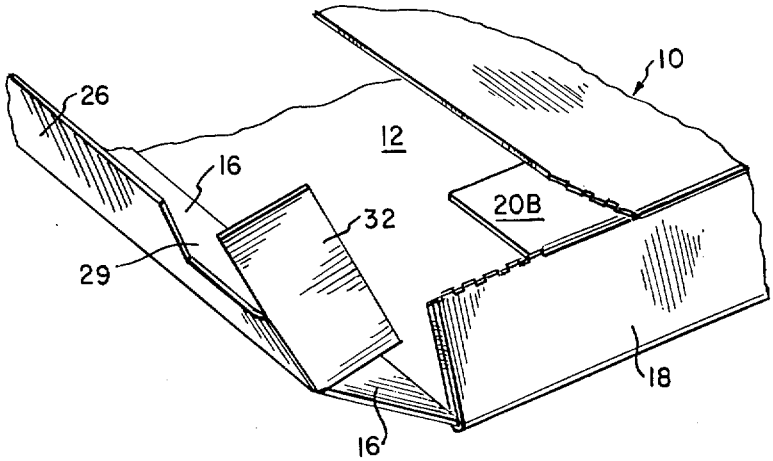
FIG. 5 is a perspective view of a portion of the erected carton wih the tear strip removed and the closure flap pulled outwardly.

In order to open the carton, it is merely necesary for the user to grasp the visible portion of the closure flap 26 and pull it away from the erected carton thereby tearing the carton top wall portion 10A from the outer end flap outer portions 18A along the perforated score lines 28, resulting in the opened carton illustrated in FIG. 5. The remainder of the carton need not be damaged in any way in order to remove the contents of the carton.

If it is desired to repack the contents of the carton for re-mailing, it is merely necessary to reinsert the closure flap end tabs 32 into the carton to the position which these tabs occupied in FIG. 2, thereby closing the carton, and to wrap a piece of tape 42 about the carton along the space previously occupied by the tear strip, as illustrated in FIG. 6. Although the perforated score lines 28 have been torn, the tape will hold the closure portion, generally designated 40 in FIG. 5, in place so that the repacked and taped carton can be mailed without damaging the contents of the carton.

Upon examining the foregoing disclosure, those skilled in the art may devise embodiments of the concepts involved which differ somewhat from the embodiment shown and described herein or may make various changes in the structural details to the present embodiment. Consequently, all such changes, embodiments or variations in structure as utilize the concepts of the invention and incorporate the spirit thereof are to be considered as within the scope of the claims appended herebelow.

What is claimed is:

1. In a carton for packaging an article comprising a rectangularly shaped top wall, a rectangularly shaped bottom wall, a pair of trapezoidally shaped side walls foldably connected to each side of said bottom wall, one of said pair of side walls also being foldably connected to one side of said top wall, a first pair of end flaps, each of said first end flaps being foldably connected to one end of said bottom wall along a first foldine line, a pair of tabs being formed in said bottom wall, each of said pair of tabs being foldably connected to said bottom wall along a second folding line, said second folding line being spaced inwardly with respect to said bottom wall from said first folding line, at least a portion of each of said pair of tabs being formed from a cutout portion of said bottom wall, each of said first end flaps including an inner portion and an outer portion, said inner portion being foldably connected to said outer portion along a third folding line, said end flap inner portion being foldably connected to said bottom wall and being coextensive in length with said bottom wall, the improvement comprising said first end flap outer portion being a first predetermined amount (X) shorter in length than said end flap inner portion, said first end flap outer portion being equal in width to a second predetermined amount (L), a closure flap being hingedly connected to the other of said pair of side walls, said closure flap having a pair of end portions extending inwardly from the ends of said closure flap a distance equal to the second predetermined amount (L), said closure flap end portions being equal in width to the first predetermined amount (X), said closure flap and said first end flap outer portions being normally positioned parallel to said bottom wall and being coplanar with each other.

2. The improvement recited in claim 1, further comprising a tear strip being formed in said top wall, said tear strip being normally spaced from the side edge of said top wall a distance approximately equal to the width of said closure flap such that tearing away of said tear strip exposes the side edge of said closure flap.

3. The improvement recited in claim 2, further comprising a second pair of end flaps, each of said second pair of end flaps including an inner portion and an outer portion, each of said second end flap inner portions being foldably connected to said top wall along a fourth folding line and being normally positioned to overlie said first end flap inner portion, only the inner surfaces of each of said second end flap outer portions having glue applied thereto.

4. The improvement recited in claim 3, further comprising a pair of perforated score lines being formed in said top wall, said score lines extending along said fourth folding line from the ends of each tear strip to the side edge of said top wall.

5. The improvement recited in claim 1, further comprising a pair of tabs being foldably connected to each end of said closure flap, said closure flap end tabs being normally positioned to intersect said first folding line formed between said bottom wall and said end flap inner portion.

*6. In a carton for packaging an article comprising a rectangularly shaped top wall, a rectangularly shaped bottom wall, a pair of trapezoidally shaped side walls foldably connected to each side of said bottom wall, one of said pair of side walls also being foldably connected to one side of said top wall, a first pair of end flaps, each of said first end flaps being foldably connected to one end of said bottom wall along a first folding line, each of said first end flaps including an inner portion and an outer portion, said inner portion being foldably connected to said outer portion along a third folding line, said end flap inner portion being foldably connected to said bottom wall and being coextensive in length with said bottom wall, the improvement comprising said first end flap outer portion being a first predetermined amount (X) shorter in length than said end flap inner portion, said first end flap outer portion being equal to width to a second predetermined amount (L), a closure flap being hingedly connected to the other of said pair of side walls, said closure flap having a pair of end portions extending inwardly from the ends of said closure flap a distance equal to the second predetermined amount (L), said closure flap end portions being equal in width to the first predetermined amount (X), said closure flap and said first end flap outer portions being normally positioned parallel to said bottom wall and being coplanar with each other.*

*7. The improvement recited in claim 6, further comprising a tear strip being formed in said top wall, said tear strip being normally spaced from the side edge of said top wall a distance approximately equal to the width of said closure flap such that tearing away of said tear strip exposes the side edge of said closure flap.*

*8. The improvement recited in claim 7, further comprising a second pair of end flaps, each of said second pair of end flaps including an inner portion and an outer portio, each of said second end flap inner portions being foldably connected to said top wall along a fourth folding line and being normally positioned to overlie said first end flap inner portion, only the inner surfaces of each of said end flap outer portions having glue applied thereto.*

*9. The improvement recited in claim 8, further comprising a pair of perforated score lines being formed in said top wall, said score lines extending along said fourth folding line from the ends of said tear strip to the side edge of said top wall.*

*10. The improvement recited in claim 6, further comprising a pair of tabs being foldably connected to each end of said closure flap, said closure flap end tabs being normally positioned to intersect said first folding line formed between said bottom wall and said end flap inner portion.*

* * * * *